C. F. W. LASCH.
HOSE COUPLING.
APPLICATION FILED MAY 10, 1910.
992,680.
Patented May 16, 1911.
2 SHEETS—SHEET 1.
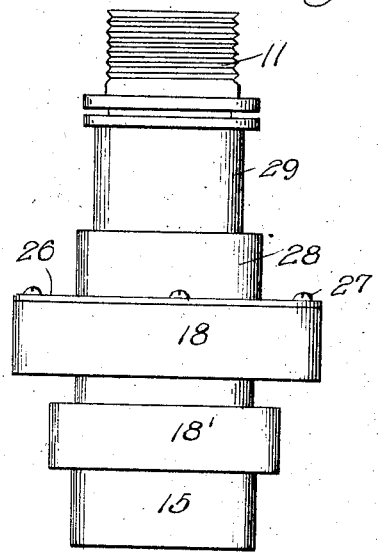
Fig. 1.
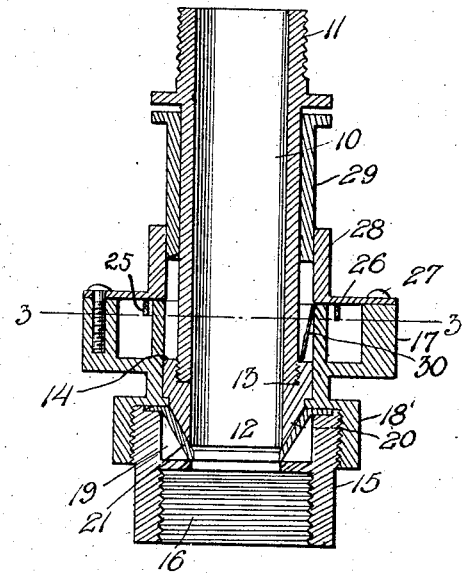
Fig. 2.
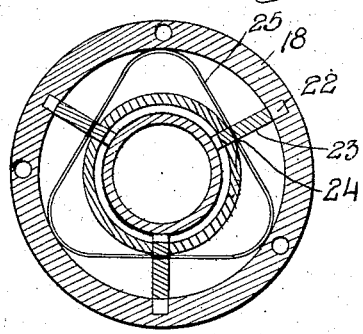
Fig. 3.
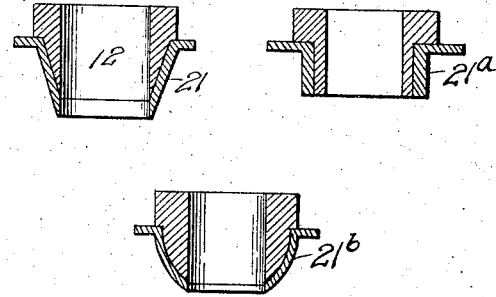
Fig. 4.  Fig. 5.
Fig. 6.
WITNESSES
G. M. Spring
L. E. Barkley
INVENTOR
Charles F. W. Lasch
by Franks Ahuleman
Attorney

C. F. W. LASCH.
HOSE COUPLING.
APPLICATION FILED MAY 10, 1910.

992,680.

Patented May 16, 1911.

2 SHEETS—SHEET 2.

WITNESSES
G. M. Spring
L. E. Barkley

INVENTOR
Charles F. W. Lasch,
by Thomas Auuleman
Attorney

UNITED STATES PATENT OFFICE.

CHARLES F. W. LASCH, OF LOUISVILLE, KENTUCKY.

HOSE-COUPLING.

992,680. Specification of Letters Patent. Patented May 16, 1911.

Application filed May 10, 1910. Serial No. 560,476.

*To all whom it may concern:*

Be it known that I, CHARLES F. W. LASCH, a citizen of the United States of America, and resident of Louisville, in the county of Jefferson and State of Kentucky, have invented certain new and useful Improvements in Hose-Couplings, of which the following is a specification.

This invention relates to hose couplings and particularly to a detachable hose coupling having novel means for preventing leakage at the joint between the sections of the coupling and the invention further contemplates the provision of novel means for securing the sections of the coupling together, novel means being also provided for causing a release or disengagement of the means for securing the locking sections of the coupling together.

A further object of this invention is to provide a coupling in which the members of the coupling are provided with means for preventing movement with relation to each other the same being provided with interlocking devices which hold them against rotation.

Furthermore, an object of this invention is to provide a hose coupling of the character noted which will prove strong and durable as well as efficient and satisfactory in use.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 7:
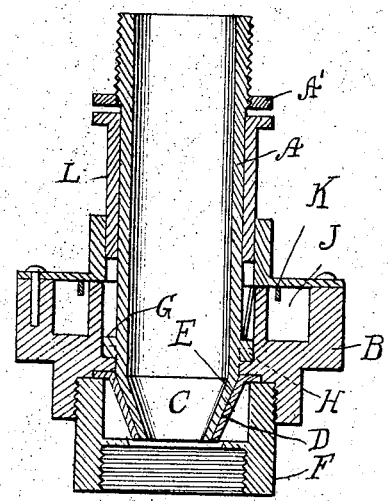
Figure 8:
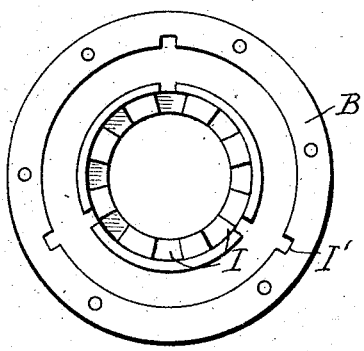
Figure 9:
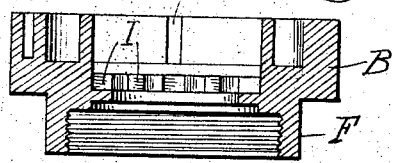
Figure 10:
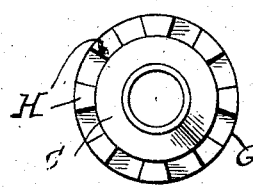
Figure 11:
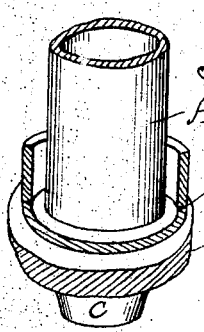
Figure 12:
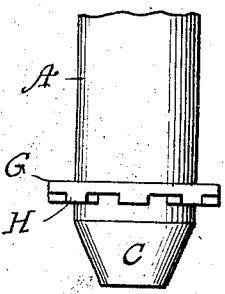
Figure 13:
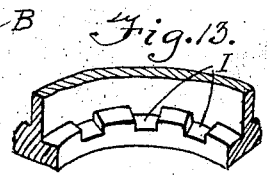

Figure 1 illustrates a view in elevation of a hose coupler embodying the invention; Fig. 2 illustrates a central longitudinal sectional view thereof; Fig. 3 illustrates a transverse sectional view on a line corresponding with the line 3—3 of Fig. 2; Figs. 4, 5 and 6 illustrate detail views showing modified arrangements of the ends of the male sections designed to coact with the seat in the female section; Fig. 7 illustrates a vertical sectional view of a hose coupling embodying a slight modification as compared with that shown in Fig. 2; Fig. 8 illustrates a top plan view of one of the members; Fig. 9 illustrates a transverse vertical sectional view of the member shown in Fig. 8; Fig. 10 illustrates an end view of the male member of the coupling; Fig. 11 illustrates a perspective view of the said male member and a fragment of the female member; Fig. 12 illustrates a side elevation of the male member; and Fig. 13 illustrates a perspective view of a fragment of the female member in section.

In these drawings 10 denotes the pipe section having a nipple 11 to which the hose is to be secured, the said section 10 having a nose or inner end 12, the internal bore of which is provided with an annular shoulder 13 on which the end of the pipe section 10 is seated, the annular shoulder being formed by recessing the internal wall of the nose 12 which internal wall is threaded to engage the threads of the pipe section 10. It will be seen from an inspection of Fig. 2 that the nose at its junction with the pipe 10 has an annular shoulder 14 surrounding the pipe section 10 which is designed to be engaged by latches to be presently described.

A female section 15 has a threaded internal wall 16 having connection to a hose, nipple or the like, though the construction of this part of the said member is immaterial and it may be varied to suit particular requirements. There is a housing 17 provided with a flange 18' internally threaded to engage threads on the member 15, and the member 15 is formed so as to provide a space 19 into which the tapered end 20 of the pipe section 10 extends, it being understood that a gasket 21 coacts with the surface 20 and is pressed by the force of the water into contact with the tapered end 20 so that leakage at the joint between the male and female member is prevented. It will be seen that the edge of the gasket is clamped between the housing and the inner edge of the female member whereby it is held in place.

The housing is provided with a series of radial slots 22 which are designed to receive the latches 23 which latches are slidable radially in order that their noses may engage the shoulder 14 as fully shown in Fig. 2. The housing has an annular rib or web integral with it at or near the inner wall and the said web has slots therein for the reception of the latches for the said latches are slidable through the slots and are guided by the web. The latches are provided with slots 24 in which a spring 25 is seated, the said spring being of such contour as to engage the outer wall of the housing at points between the latches, the said spring acting to force the noses of the latches into engagement with the shoulder 14.

A cap 26 is secured to the housing by means of screws 27 and the said cap has a flange 28 surrounding a portion of the pipe 10 but standing from it in order to form a space in which a collar 29 is slidable, the said collar surrounding the pipe 10 and serving to act on the latches for the purpose of forcing their noses out of engagement with the shoulder 14. As shown in Fig. 2, the inner edges of the latches have cam surfaces 30 which are acted on by the collar 29 in the manner indicated, that is to force the said latches outwardly from engagement with the shoulder 14.

From an inspection of the drawing, therefore, it will be observed that when the members of the coupler are brought together into the position shown in Fig. 2 and the collar 29 is moved to the position which it assumes in said figure, the latches are free to be acted upon by the spring 25 and forced into locked engagement with the shoulder 14, whereby the coupling is effected. It will be observed also, from an inspection of Fig. 1, that when the sections of the coupling are in operative relation, the interior mechanism thereof is protected against the access of dirt and foreign substances and that such a coupling will be neat in appearance. When it is desired to disconnect the sections of the coupler, the collar 29 may be moved longitudinally of the pipe section 10 into engagement with the cam surfaces 30 of the latches and hence said latches will be moved radially out of engagement with the shoulders 14 when, as stated, the sections may be disconnected.

Fig. 4 illustrates the nose 12 as being of the same construction as it appears in Fig. 2, except as to the means for attaching it to the pipe section. It is obvious that this attaching means is susceptible of various modifications, and that the configuration of the nose may also be modified in various ways, for instance, as shown in Fig. 5, at 21ᵃ, and as shown in Fig. 6, at 21ᵇ. On account of the manifest variations that may be made in the details of construction, I do not wish to be limited with respect to such details.

In the modification shown in Figs. 7 to 13 inclusive, I have provided means for preventing rotation of the male member A with relation to the housing B. In this form, I have also produced the male member A and the nose C integral instead of having these elements separate as they are shown in Fig. 2. By tapering the nose C, I form on the outer surface a beveled wall D with which the washer or gasket E coacts, the said washer being interposed between the male member and the female member F. The remainder of the structure shown in these Figs. 7 to 13 is the same as that heretofore illustrated and described, except that the male member A is provided with a collar G which is integral therewith and extends from the side thereof, the said collar being provided with a series of teeth H which fit in the recesses I of the female member, the said recesses forming seats, as stated, for the teeth and when said teeth are seated therein, movement or rotation of the male member with relation to the female member is obviated. The collar A' may be threaded on to the member A, or it may be secured by any proper means, after the member L has been placed thereon. The housing B in this connection is provided with the recesses I' in its wall, which are designed to receive the latches one of which is shown at J, Fig. 7, and which are similar in all respects to those heretofore described, the said latches being under the control of the spring K, and caused thereby to engage the collar G on the male member for the purpose of retaining the parts in place, it being understood of course that the latches J are adapted to be disengaged from the collar D by means of the collar L, and as these parts have been described heretofore in detail the operation will, it is thought, be understood.

I claim—

1. In a coupling, a pipe section having a nose thereon, said nose having an annular shoulder outside of the pipe section, a female member having a housing, latches movable in the housing, a spring for holding the latches in engagement with the shoulder, said spring being of substantially triangular outline, the several angles thereof bearing upon the housing and a collar slidable on the pipe section for engaging the latches.

2. In a hose coupling, a male and female member, a cone-shaped gasket forming a packing therebetween, a housing carried by the female member, latches slidable in the housing, a shoulder on the male member engaged by the latches, and means for holding the latches in engagement with the shoulder including a resilient member of substantially triangular outline, the several angles thereof bearing upon the housing.

3. In a coupling, a pipe-section having a nose thereon, said nose having an annular shoulder outside of the pipe-section, a female-member having a housing, cam surface equipped latches movable in said housing, a spring common to all of the latches and of substantially triangular outline, the several angles of said spring bearing upon said housing and a collar slidable upon said pipe-section and adapted to engage the cam surfaces of said latches.

4. In a hose coupling, a male and female member having an interposed gasket, the said female member having a housing, latches slidable in the housing, said latches having slots, a spring seated in the slots and operating to force the latches inwardly, said spring being substantially of triangular outline, the several angles thereof bearing upon said housing, said latches having cam surfaces on their inner edges, a cap for the housing having a flange surrounding the male section but standing a distance therefrom, and a collar slidable between the flange and male member and adapted to engage the latches.

5. In a hose coupling, a male and female member, a cone-shaped gasket forming a packing therebetween, a housing carried by the female member, latches having cam surfaces upon their inner edges and slidable in the housing, said housing having slots for the reception of the latches, a shoulder on the male member engaged by the latches, means for holding the latches in engagement with the shoulder including a spring common to all of said latches and of substantially triangular outline, the several angles thereof bearing upon the housing, and a collar slidable on the pipe section adapted to engage said surfaces to disengage the latches from the shoulder.

In testimony whereof, I hereunto affix my signature in the presence of two witnesses.

CHARLES F. W. LASCH.

Witnesses:
ALBERT C. DICK,
WILLIAM KRIEGER.